Patented Feb. 2, 1954

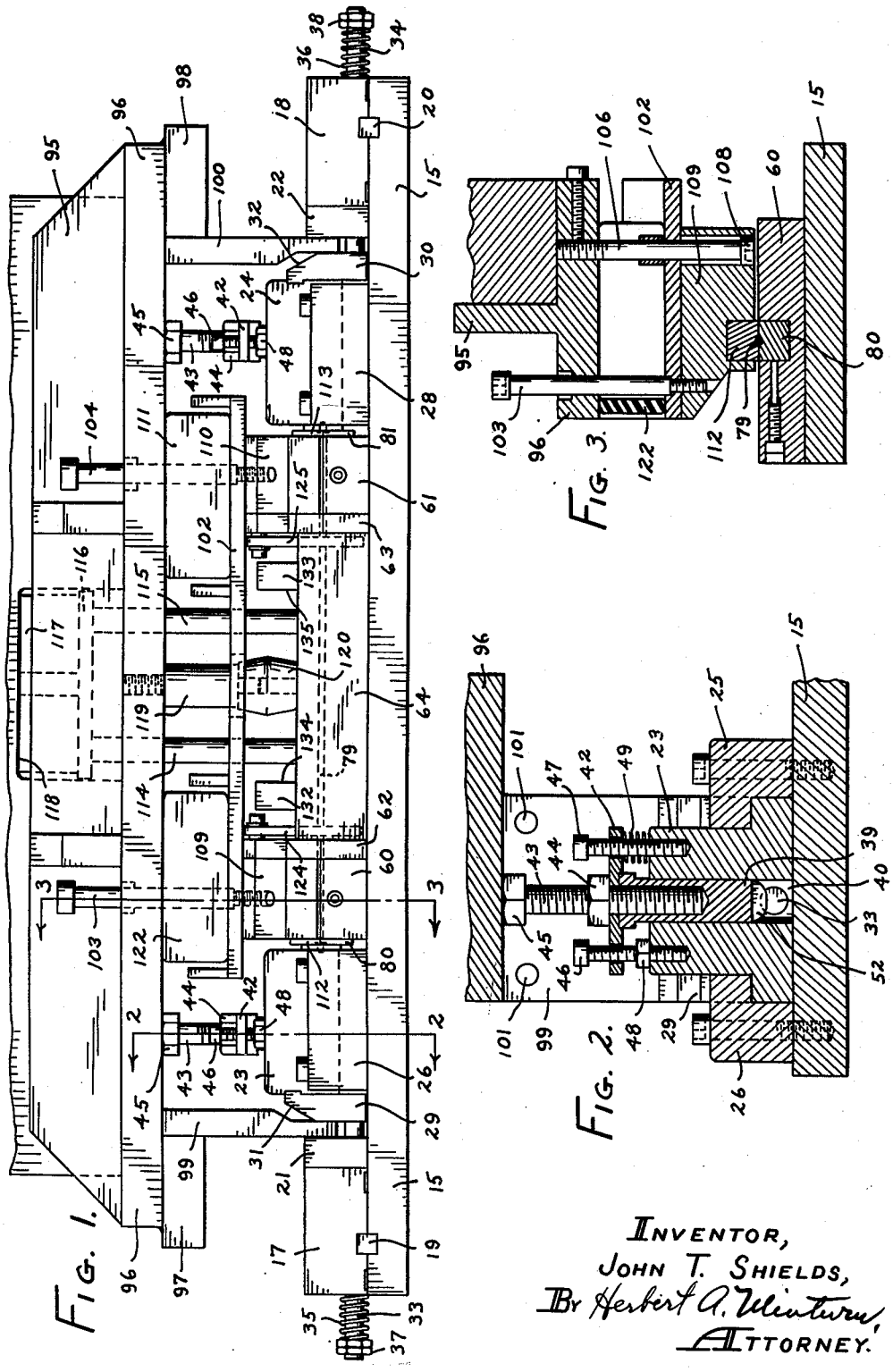

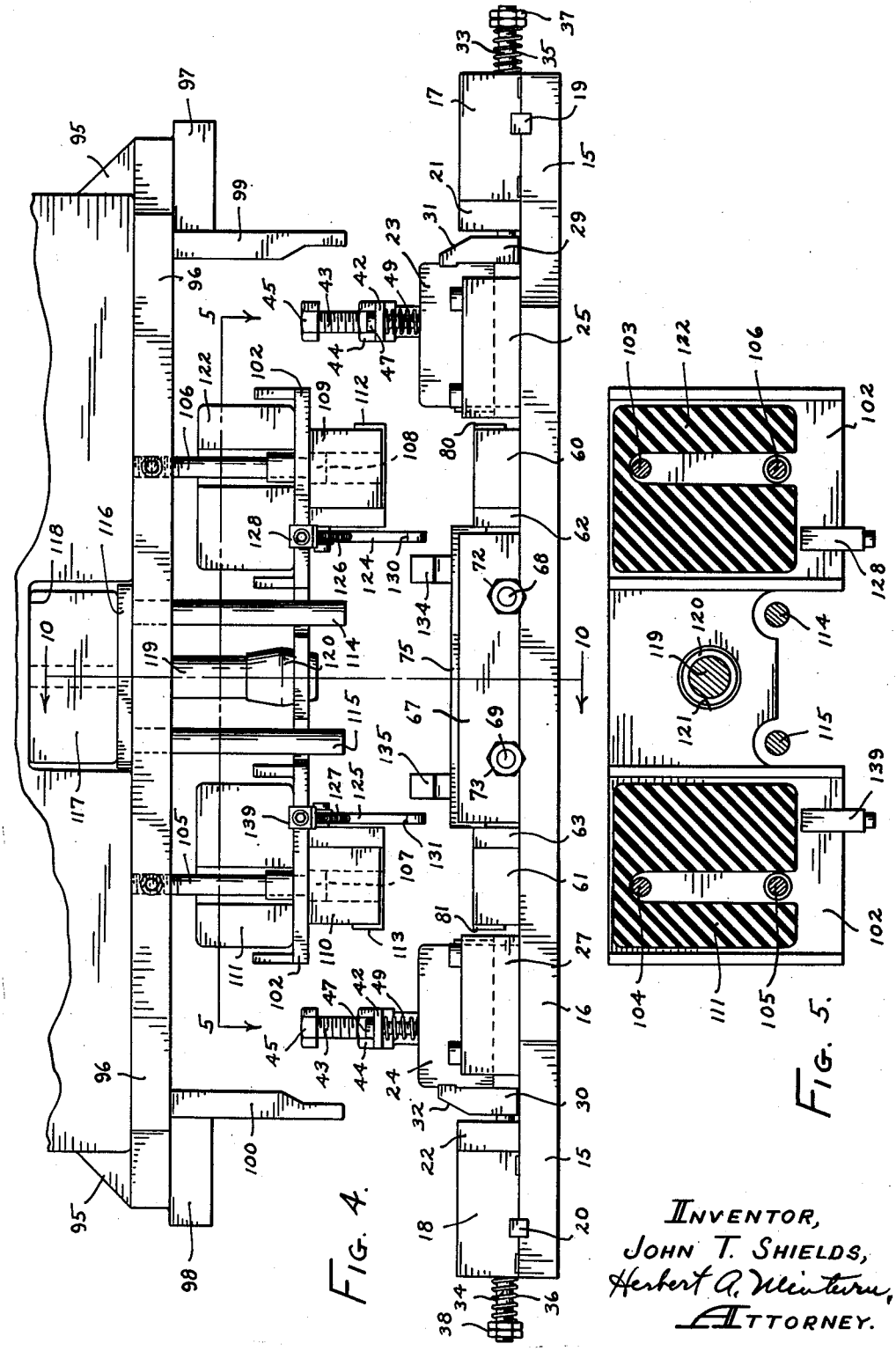

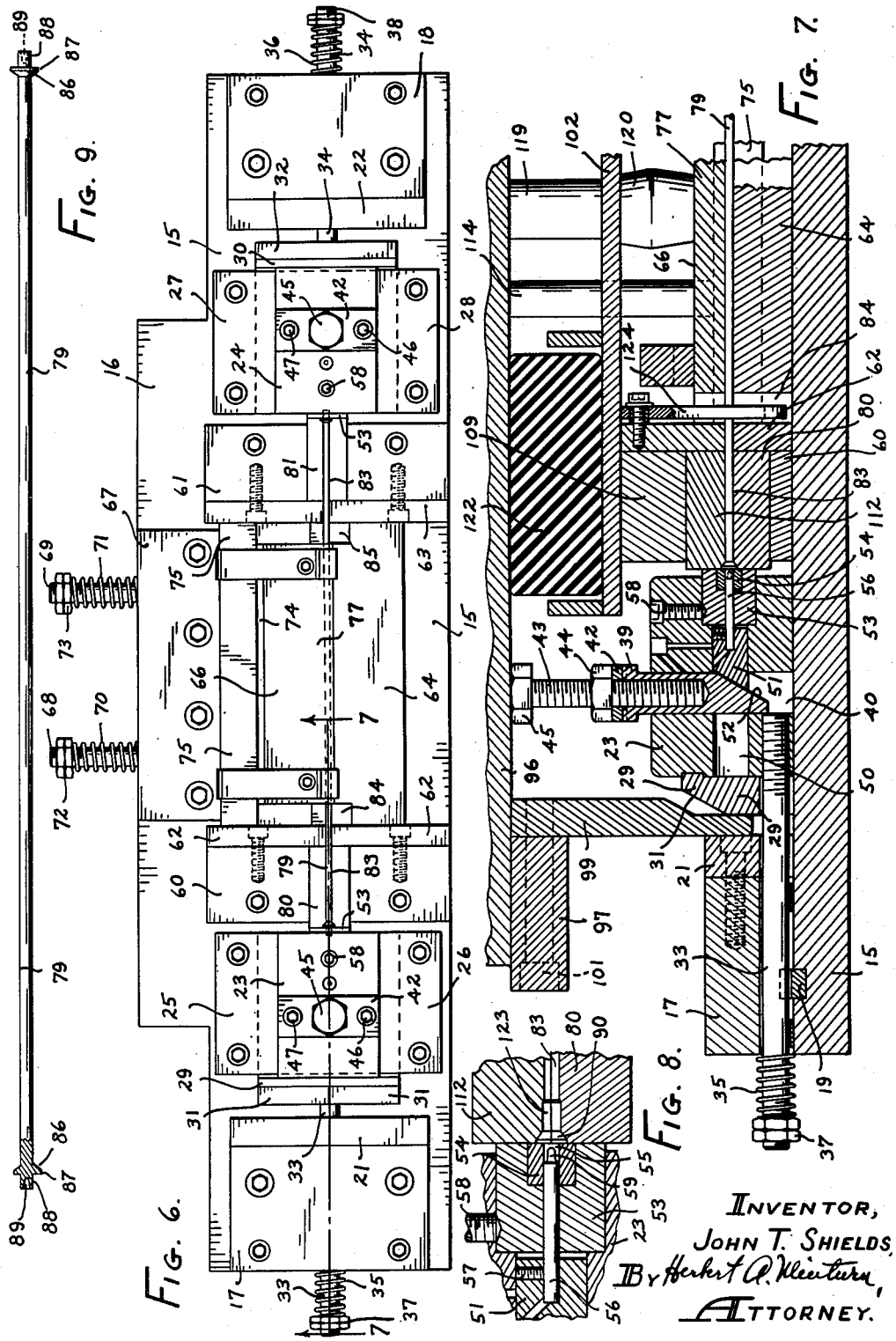

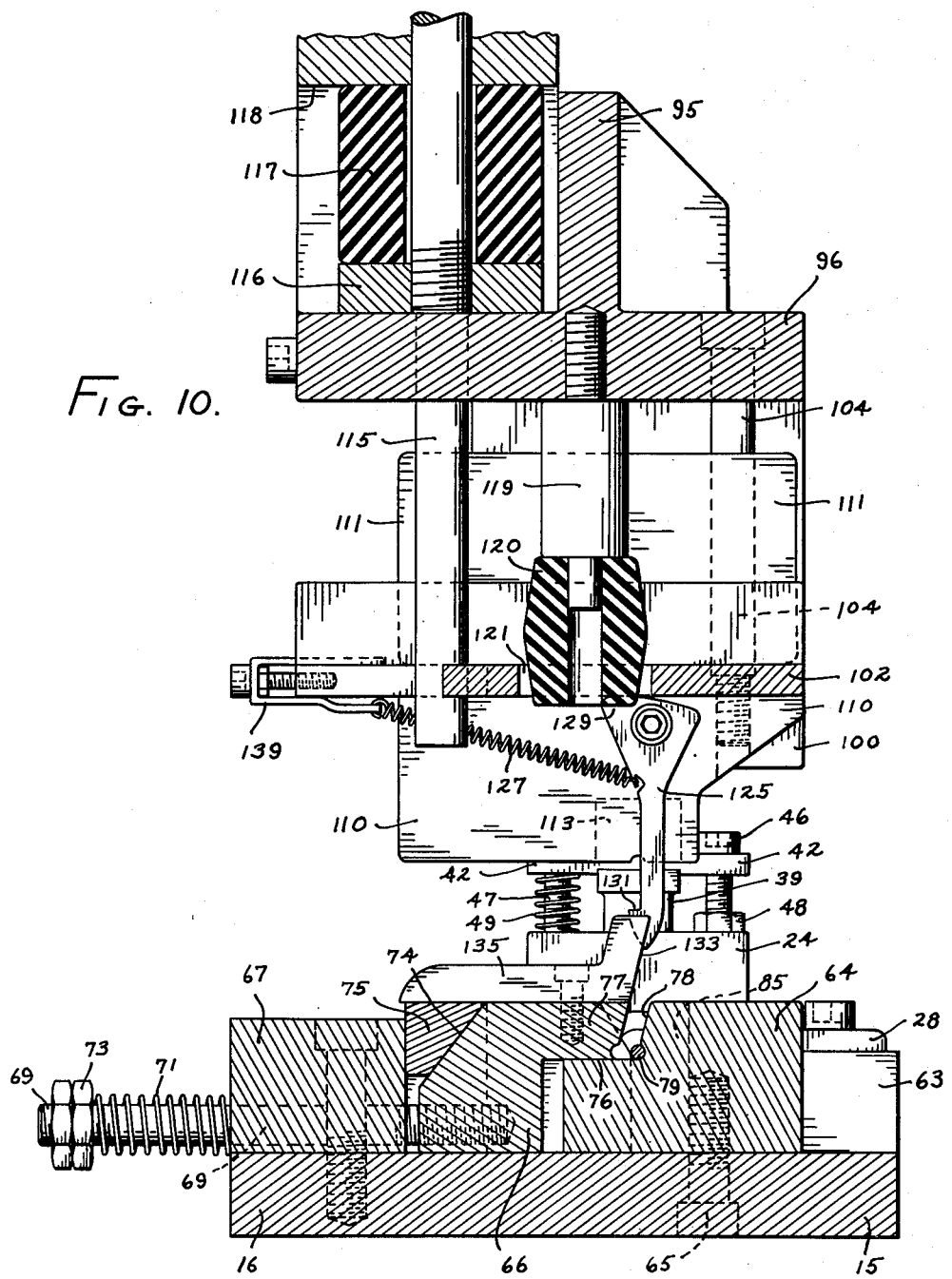

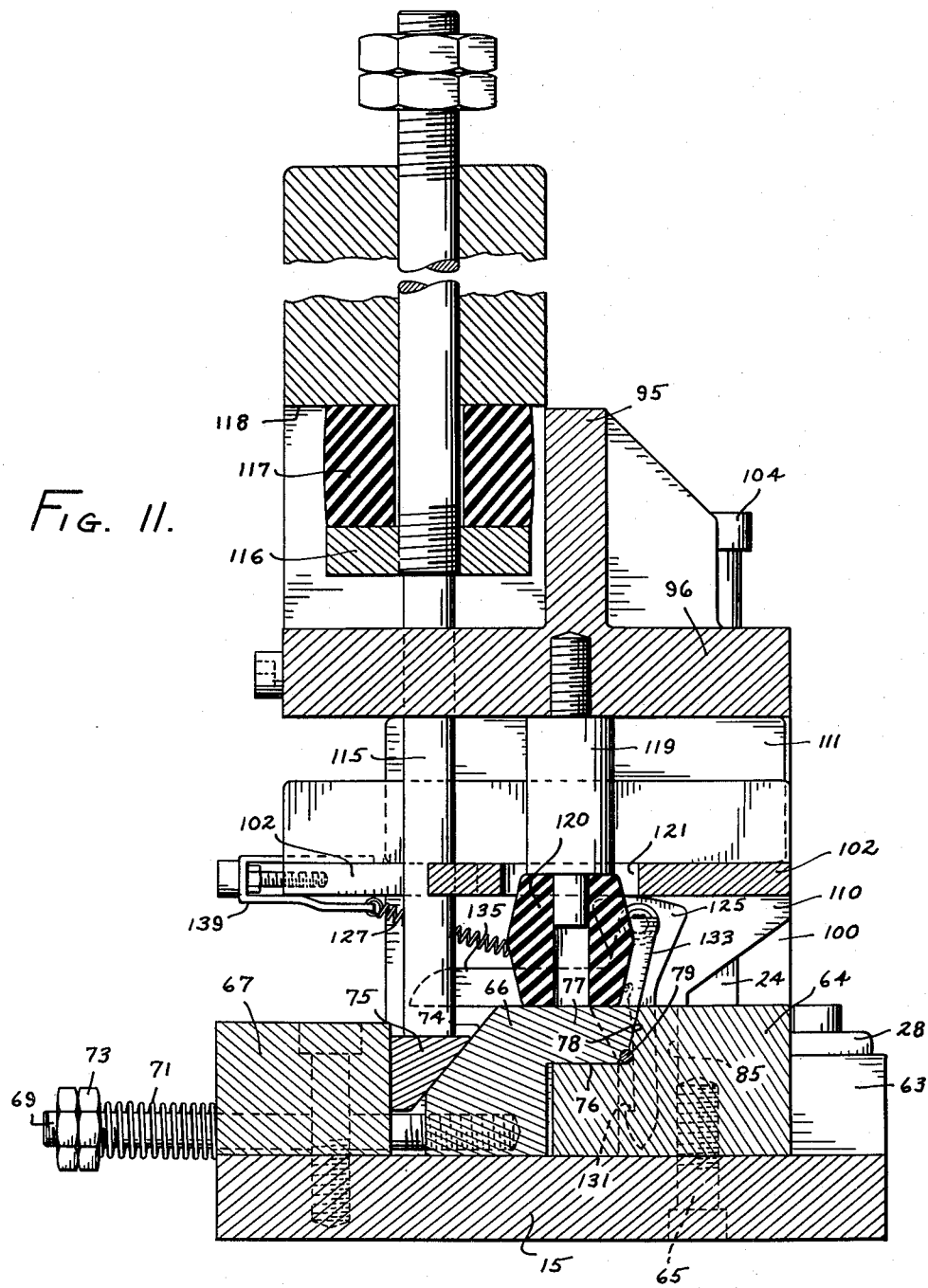

2,667,796

UNITED STATES PATENT OFFICE 2,667,796

DOUBLE END ROD FORMING DEVICE

John T. Shields, Bedford, Ind.

Application June 19, 1950, Serial No. 169,036

9 Claims. (Cl. 78—17)

This invention relates to an apparatus for simultaneously forming a head on each end of a rod, in an entirely automatic manner. One of the primary objects of the invention is to provide a structure which will head both ends of the rod and hold longitudinal dimensions accurate within at least two thousandths of an inch plus or minus. A further important object of the invention is to provide a structure which will form uniformly shaped heads on the rods, and will form each head in its exact relationship to the longitudinal length of the rod, whereby the rods are in effect centrally spaced as between the end heads, with no over or under lengths extending therebeyond.

One immediate use of the invention is in the forming of rods out of aluminum stock to be assembled into trays going into refrigerators and the like. It is necessary that such rods be made to very close limits as to lengths so that when the tray is assembled, there will be no possibility of a loose rod appearing to set up vibrations, and furthermore the rods must fit tightly and snugly in the end members so that when tubular members are employed to form the frame work of the tray, there will not be moisture accumulating to run out.

A still further important object of the invention is to be able to not only maintain extreme accuracy in the forming of the rods, but also to be able to achieve that accuracy in a very high rate of production. A still further important object of the invention is to be able to employ the structure in a simple punch press where the reciprocating action thereof will produce all of the various operations required in the apparatus in the up and down travel of the head of the press. There is further achieved in the invention, the ability to maintain the structure over long periods of operation without shutdowns, and to provide means for very accurate adjustment to take up wear, all resulting from the unique assembly of the various elements entering into the apparatus.

These and many other objects and advantages of the invention will become apparent to those versed in the art in the following description of one particular form thereof as now best known to me, and as illustrated in the accompanying drawings, in which:

Fig. 1 is a view in side elevation from the feeding side, of the structure in a "closed" condition;

Fig. 2 is a vertical section on an enlarged scale on the line 2—2 in Fig. 1;

Fig. 3 is a detail in vertical section on the line 3—3 in Fig. 1;

Fig. 4 a view in side elevation from the reverse side as shown in Fig. 1, and with the apparatus in an "opened" condition;

Fig. 5 a horizontal transverse section on the line 5—5 in Fig. 4;

Fig. 6 a top plan view of the lower die portion with the upper portion removed;

Fig. 7 a detail on an enlarged scale in vertical longitudinal section on the line 7—7 in Fig. 6;

Fig. 8 a detail in vertical section on a still further enlarged scale of the header pin die block;

Fig. 9 a view in side elevation of a rod to be formed by the die;

Fig. 10 a view on an enlarged scale centrally and transversely through the structure on the line 10—10 with the die parts in the "opened" condition, in Fig. 4;

Fig. 11 a view in vertical section similar to that in Fig. 10, but with the die parts in the "closed" condition.

Like characters represent like parts throughout the several views in the drawings.

On a mounting or bed plate 15 which is generally rectangular in shape with a discharge side offset portion 16, I mount at the opposite end portions on the top side thereof the abutment blocks 17 and 18. These blocks 17 and 18 are preferably keyed to the bed plate 15 in order to assure that there is no travel thereof longitudinally on the plate 15. As shown in the drawings, these plates are provided with the keys 19 and 20 respectively interengaging between them and the plate 15. Each of these abutting blocks 17 and 18 is preferably provided with wear plates 21 and 22 secured on their vertical faces, one opposing the other.

Spacing inwardly of each wear plate 21 and 22 is a head 23 and 24 mounted to be reciprocable longitudinally of the plate 15. Each of these heads 23 and 24 is respectively carried through the side clamps 25, 26, and 27, 28, which are secured to the plate 15. On the sides of these heads 23 and 24 directed toward the wear plates 21 and 22, there are mounted respectively the cam blocks 29 and 30. These cam blocks 29 and 30 have their outer upper face portions sloped upwardly and outwardly away from the plates 21 and 22 respectively. These faces are designated by the numerals 31 and 32.

The heads 23 and 24 are normally urged to outer positions whereby the cam blocks 29 and 30 bear normally against the respective wear plates 21 and 22. This biasing of the heads 23 and 24 is set up by means of the stud bolts 33 and 34 engaging screw-threadedly in each of the heads 23 and 24 respectively and extending freely through the blocks 17 and 18 and outwardly therefrom to carry compression springs 35 and 36 respectively abutting the outer ends of the blocks 17 and 18, by their inner ends, and by their outer ends the adjusting nuts 37 and 38.

In each of the heads 23 and 24, there is provided a vertically reciprocable plunger 39 slidable in a bore 40. The upper end of the plunger 39 has a plate 42 resting thereon, to receive therethrough a cap screw 43 which extends screw-threadedly and axially into the plunger 39. A nut 44 carried by the screw 43 is turned downwardly against the top side of the plate 42 to secure that plate firmly and securely against the plunger 39. The head 45 of the screw 43 extends some distance above the plate 42.

As best shown in Fig. 2, this plate 42 receives freely therethrough in its outer end portions the cap screws 46 and 47. The one cap screw 46 is screw-threadedly received in the head 23 and fixed in position by a jam nut 48 run down against the top of the head so that the desired length of the cap screw 46 extends thereabove. The other cap screw 47 is also screw-threadedly received by the head 23, and this screw 47 carries a compression spring 49 between the plate 42 and the top side of the head 23 as a means for normally urging the plate 42 to its uppermost position as permitted by the heads of the respective screws 46 and 47. Pressure on the head 45 of the screw 43 will thus lower the plunger 39 against the resistance of the spring 49.

In each of the heads 23 and 24, as best shown in Figs. 7 and 8, in reference to the head 23, the same structure being formed identically in the head 24, there is a horizontally disposed bore 50 within which there is slidingly carried a pin block 51. This pin block 51 has a face diagonally disposed to be substantially parallel to the face 52 on the lower end of the plunger 39. The angle of the face 52 is such that when the screw 43 is forced downwardly, the plunger 39 presses against the pin body 51 to urge it to the right in the bore 50.

Each of the heads 23 and 24 also carries a die holder 53 entered from the inner face respectively of the heads, to be axially aligned with the bore 50, and held in position by any such means as a set screw 58. This holder 53 carries a cylindrical die 54 having a cylindrical bore therethrough designated by the numeral 55, Fig. 8. This bore 55 is axially aligned with the bore 50, and there is a pin 56 carried by the block 51 and slidingly passed through the holder 53 to enter the bore 55. The pin 56 is secured in the block 51 by means of a set screw 57.

The pin 56 carries a reduced diameter nose 59 on its end which extends into the bore 55 of the die 54, and this nose 59 while generally cylindrical in shape and of less diameter than that of the pin 56 itself, is rounded on its end.

Between the heads 23 and 24, there are fixed to the base plate 15 a pair of blocks 60 and 61, each of which has a wear plate 62 and 63 respectively fixed against their vertical, opposing faces. Between the two faces 62 and 63, there is fixed on the bed 15 a rod abutment block 64. The block 64 is fixed to the bed plate 15 in any suitable manner such as by set screw attachments as indicated by the set screw shown in Figs. 10 and 11, and designated by the numeral 65.

A wire holder clamp jaw 66 is mounted on the top side of the plate 15 to slide between the rear side of the holder block 64 and a fixed block 67 which is secured to the portion 16 of the plate 15, this block 67 being spaced from the member 66 a distance to permit shifting of the member 66 between it and the holder block 64. Normally the jaw 66 is pulled toward the stop block 67 by means of a pair of bolts 68 and 69 which carry compression springs 70 and 71 respectively between outer nuts 72 and 73 and the back face of the block 67, these bolts 68 and 69 slidingly passing through the block 67 to screw-threadedly engage the jaw member 66, Figs. 10 and 11.

The rear corner portion of the jaw 66 is beveled to give a diagonally aligned face 74. A cam block 75 in the nature of a wedge is placed between the forward side of the block 67, and this face 74, Figs. 10 and 11.

The wire holder member 64 has a shelf 76 over which a projection 77 of the jaw 66 rides. At the juncture of this shelf 76 with the face 78 upturned therefrom, is provided a substantially semi-circle groove of substantially the same radius of curvature as that of a rod 79 which is to be formed. The lower corner of the forwardly projecting portion 77 of the jaw 66 is likewise rounded in a concave manner so that when that portion 77 is brought against the face 78, the wire 79 is completely surrounded and held in a fixed position in respect to lateral displacement relatively to the holder 64. As indicated in Figs. 10 and 11, this face 78 is inclined upwardly and forwardly.

In each of the blocks 60 and 61, there is fixed the lower half of dies 80 and 81. Each of these lower half dies 80 and 81 are in the form herein shown rectangular in cross-section, and have a semi-circular groove 83 thereacross in axial alignment with the pin 56. The block 64 is provided with vertically disposed wells 84 and 85 centered substantially on the grooves across the lower half die blocks 80 and 81. Likewise the wear plates 62 and 63 are grooved thereacross to continue the groove 83.

Referring to the rod 79 as illustrated in Fig. 9, which is the final product to be formed by the apparatus constituting the invention, it is to be noted that on each end of this rod there is a head generally designated by the numeral 86. The head 86 is frusto-conical in shape, terminating with an annular cylindrical base portion 87, from which the rod extends by a short nipple portion 88 having substantially the same diameter as that of the rod 79. This nipple 88 is pierced in part to have a reentering cavity 89 formed therein. This cavity is of a depth substantially half of the length of the nipple 88.

Therefore the lower half die block 80 is formed, Fig. 8, to have the lower half of the frusto-conical shape 90 corresponding to the half of the head 86, and the diameter of the bore 55 in the die 54 is made to be equal to that of the nipple 88.

All of the apparatus so far described is carried by the plate 15 which in turn is mounted upon the bed of a punch press, not shown. The upper, companion part of the die will now be described.

A head generally designated by the numeral 95 is formed in the present showing to have a plate 96 presented from its under side. At opposite end portions of this plate 96, there are fixed against the under side thereof blocks 97 and 98. Against their inner opposing faces are mounted respectively cam plates 99 and 100. These plates 99 and 100 are preferably detachable for replacement or for adjustment purposes by any suitable means such as by a set screw attachment as indicated by the set screw 101, Fig. 7.

The lower end portions of the cam plates 99 and 100 are aligned with the wear plates 21 and 22 so as to enter along their opposing faces, to strike the cam blocks 29 and 30 as a means for urging the heads 23 and 24 one toward the other overcoming the springs 35 and 36. Between those two cam plates 99 and 100 there is swung a die carrier plate 102. The plate 102 is carried by four bolts, 103, 104, on the forward side, and 105 and 106, on the rear side. The bolts 105 and 106 are screw-threadedly engaged in the plate 96 to hang downwardly therefrom, and have heads 107 and 108 upon which the plate 102 rests on that side. The bolts 103 and 104 are slidingly passed through the plate 96 to extend through the plate 102 and screw-threadedly engage thereunder die carrying blocks 109 and 110. When the head 95 is in the uppermost position as indicated in Fig. 4, the plate 102 will be suspended from the plate 96 in the spacing indicated.

Each of these holders 109 and 110, fixed against the under side of the plate 102 in turn carry the upper halves 112 and 113 of the die blocks to match the lower respective blocks 80 and 81, these die blocks 112 and 113 carry semi-circular grooves thereacross so that when the respective halves are brought down together, there will be completed therebetween a bore circular in cross-section conforming to the diameter of the wire 79. The head plate 96 carries a pair of spaced apart posts 114 and 115 which are centrally aligned over the cam plate 75. These posts 114 and 115 are slidingly guided vertically through the plate 96 to be interconnected on the top side thereof with a flat head 116, on which is carried a rubber buffer 117. This buffer 117 is mounted within a pocket of the head 95 so that it will fit snugly between the head 116 when it is lowered against the plate 96, and an upper surface 118 of the head 95, whereby the posts 114 and 115 will be yieldingly extended to their upmost lengths from the underside of the plate 96, but may yieldingly retract through the plate 96 within the degree of resilience permitted by the buffer 117.

A post 119 is fixed to extend downwardly from the under side of the plate 96 forwardly of the posts 114 and 115 to carry a rubber compressible foot 120 on its lower end to be in the path of the portion 77 of the jaw 66. Clearance is provided for the post 119 and its foot 120 through the plate 102 by the hole 121 provided in that plate. Rubber compression blocks 111 and 122 are carried on the top side of the hanging plate 102 to extend around the bolts 103, and 106 on the one side, and 104, 105, on the other side. These blocks 111, 112, Fig. 4, are normally less in height than the distance between the top side of the plate 102 and the under side of the fixed plate 96 when that plate 102 is fully suspended below the plate 96, Fig. 4.

Further details of the construction will be set forth in connection with a description of the operation which follows.

Operation

When the die parts are inoperative and in the "open" positions, they will be in those positions as indicated in Figs. 4 and 10. Any suitable rod feeding means may be employed to direct one rod at a time into the die. The feeding means does not constitute a part of the present invention, per se, and hence is not illustrated nor described. The rods are cut to a predetermined length and are fed one at a time over the stationary block 64 to allow them to drop down over the face 78 between that face and the portion 77 of the jaw 66. With a rod thus resting on the shelf 76, the head 95 is timed by the press (this head 95 being mounted on the reciprocating head of the press), to travel downwardly. In so doing, the posts 114 and 115 will strike the top side of the cam block 75 to push it downwardly and thus urge the jaw 66 laterally to cause the portion 77 to come against the face 78 and grip the rod 79 therebetween. This grip initially is such that the rod 79 may be shifted longitudinally of itself. Simultaneously with the pressing down of the cam block 75, the rubber foot 120 comes down to bear against the top side of the jaw 66, tending to hold it in position yieldingly so that the rod 79 may be shifted longitudinally as may be required, before the cam block 75 is pushed on down into that position where the rod 79 is firmly gripped thereafter against longitudinal travel and particularly lateral bending. It is to be noted that the posts 114 and 115 yieldingly bear against this cam block 75 by reason of the buffer 117 thereabove. The position of the cam block 75 and the jaw 66 in the locking-up positions are shown in Fig. 11.

While that action just described has been going on, the cam plates 99 and 100 are entering the space between the inclined faces 31 and 32 of the cam blocks 29 and 30, and the wear plates 21 and 22 so as to force the head blocks 23 and 24 longitudinally of the plate 15 one toward the other. The upper halves 112 and 113 of the dies are seated on the lower halves 80 and 81 with a very close fit. By the time this seating action has taken place, the ends of the dies 54 in each of the heads 23 and 24 have been forced snugly against the upper and lower half die members so as to form a tight fit therebetween, so tight that no flash of metal can be carried outwardly in that joint.

As these heads 23 and 24 move inwardly toward the die blocks through which the wire 79 is then extending, the outer ends of the rod tend to enter the bores 55 of the dies 54 in each instance. However entrance is obstructed by reason of the noses 59 of the pins 56 being presented therein, with the very important result that the rod is shifted longitudinally to have an equal portion of its ends extending into that bore 55 as those pins 56 are carried thereagainst by the action of the posts 39 coming down through the heads 23 and 24.

Very critical adjustments have to be made in respect to the screws 46 and the plate 42 so that the post 39 will cause the pins 56 to enter the bores 55 to those dimensions whereby the rod 79 will have an exactly equal portion presented originally in the bores 55 in each instance. The under side of the fixed plate 96 on the head 95 comes down to strike the tops of the bolt heads 45 in each instance to lower the plungers 39 and cause the longitudinal travel of the bodies 51, and in turn of the pins 56. Then as the plate 96 continues downwardly, the rubber blocks 111 and 122 still holding down the die parts 112 and 113 will yield sufficiently to permit the plunger 39 in each instance to be carried on down to that precise length of travel which will cause the noses 59 of the pins 56 to set up a cold flow in the ends of the rod simultaneously, whereby the rod end will be forced to fill the frusto-conical portion 90, and at the same time, the nose 59 will cause the dimple to be formed in the outer end of the rod as illustrated in Fig. 9, this dimple being designated by the numeral 89.

As the pin 56 is travelling against the end of the rod 79, the head not only is being formed and also the dimple 89 therein, but there is a gripping action created to prevent compression all along the rod 79 this gripping action immediately at the head end of the dies is achieved by counterboring the upper and lower die members such as is indicated by the numeral 123. This counterbore is but a few thousandths of an inch greater in diameter than is the remainder of the bore which tightly grips the wire therein. The length of this counterbore is limited to the outer end portions of the upper and lower portions of the die blocks, as best illustrated in Fig. 8.

With the wire heads formed, the head 95 travels upwardly. There must be some means to remove the formed wire 79, and such means in the present instance consist of a pair of hooked fingers 124 and 125, each respectively pivotly connected to the opposing faces of the die holder blocks 109 and 110, Fig. 4, and pulled rearwardly by springs 126 and 127 respectively interengaging the fingers by one set of ends, and by their other ends the clips 128 and 138 engaged over the rear edge portion of the plate 102.

Each of these fingers has a head whereby the spring pulling the finger rearwardly will cause a lobe 129 to rock against the under side of the plate 102 and thus arrest further rearward travel by pull of the spring 127 in reference to Fig. 10. This lobe 129 so positions the finger 125 that when the head 95 lowers, the finger will travel down through the well 85. Correspondingly, the other finger 124 will travel downwardly through the well 84. Each of these fingers 124 and 125 has a hook 130 and 131 respectively on its rear side. The wire rod 79 feeds down onto the shelf 76 prior to the lowering of these fingers by the plate 120, so that the fingers can go on down and thus lie forwardly of the rod 79 while the plate 102 is in its lower position.

When the plate 102 is lifted, these fingers 125 are drawn upwardly so they slide along the forward side of the rod 79, and the hooks 130 and 131 come into contact with the under side of the rod 79 lifting it against the jaw portion 77, and carrying it on upwardly against the forwardly inclined faces 132 and 133 of brackets 134 and 135 mounted on the top side of the jaw 66. Since these faces 133 and 132 incline forwardly, the fingers 124 and 125 will tend to be rocked rearwardly because of the rod 79 between them and those faces, with the result that when the fingers reach their uppermost position, the springs 126 and 127 will flip those fingers rearwardly and thus kick the rod 79 on over the top sides of the brackets 134 and 135 to discharge the formed rod rearwardly of the entire apparatus.

It is again pointed out that the structure permitting and causing the exact centering of the rod as between the pins 56 so as to cause the heads to form exactly symmetrical one in respect to the other on the same rod, and having the same lengths of nipples 88, whereby an exact distance may be maintained between the respective basis of the heads 86 is set up, is a very important feature of the invention.

While I have herein shown and described my invention in the one particular form, in minute detail, it is obvious that structural changes may be employed without departing from the spirit of the invention, and I therefore do not desire to be limited to that precise form beyond the limitations which may be imposed by the following claims.

I claim:

1. A device for simultaneously forming a head on each end of a rod comprising spaced die means to receive each end portion of the rod therein; heads reciprocably movable longitudinally of the rod against and away from said die means; pins longitudinally shiftable in said heads to abut the ends of said rods; and means initially positioning said pins to shift said rod longitudinally in either direction as may be required to form substantially identical length heads in said dies and hold the longitudinal length between headed portions to a precise length; said die means in each instance being divided into relatively upper and lower portions; an upper reciprocable head; a plate swung under said head in normal spaced relation thereto; elastic members yielding resisting movement of the plate toward the head; said upper die means portions being carried by said plate; a stationary rod receiving member between said die means; a rod clamp jaw shiftable toward said receiving member to hold said rod between said die means; and yielding means permitting said shifting of the rod.

2. A double end rod heading device comprising a central fixed member; an under die block at each end of said member; an upper reciprocable member; a pair of upper die blocks carried by said reciprocable member to match respectively said under die blocks when lowered thereagainst; a die head mounted to reciprocate longitudinally toward and away from each of said under die blocks; means normally biasing each of said die heads to positions away from the under die blocks; a reciprocable head to which said reciprocable member is shiftably attached; resilient means between said reciprocable member and said reciprocable head; a cam face on each of said die heads; and cam followers carried by said reciprocable head to contact respectively said cam faces to drive said die heads against the outer ends of said upper and lower die blocks when closed upon travel of said reciprocable head theretoward.

3. A double end rod heading device comprising a central fixed member; an under die block at each end of said member; an upper reciprocable member; a pair of upper die blocks carried by said reciprocable member to match respectively said under die blocks when lowered thereagainst; a die head mounted to reciprocate longitudinally toward and away from each of said under die blocks; means normally biasing each of said die heads to positions away from the under die blocks; a reciprocable head to which said reciprocable member is shiftably attached; resilient means between said reciprocable member and said reciprocable head; a cam face on each of said die heads; and cam followers carried by said reciprocable head to contact respectively said cam faces to drive said die heads against the outer ends of said upper and lower die blocks when closed upon travel of said reciprocable head theretoward; a pin longitudinally, slidably carried in each of said die heads axially aligned with the central axis through said lower and upper die blocks; and a plunger slidably entering each of said die heads to have an upper end respectively in the path of said reciprocable head, said plunger having a lower face for driving said pin outwardly toward said die blocks.

4. A double end rod heading device comprising a central fixed member; and under die block at each end of said member; an upper reciprocable member; a pair of upper die blocks carried by said reciprocable member to match respectively said under die blocks when lowered thereagainst; a die head mounted to reciprocate longitudinally toward and away from each of said under die blocks; means normally biasing each of said die heads to positions away from the under die blocks; a reciprocable head to which said reciprocable member is shiftably attached; resilient means between said reciprocable member and said reciprocable head; a cam face on each of said die heads; and cam followers carried by said reciprocable head to contact respectively said cam faces to drive said die heads against the outer ends of said upper and lower die blocks when closed upon travel of said reciprocable head theretoward; a pin longitudinally, slidably carried in each of said die heads axially aligned with the central axis through said lower and upper die blocks; and a plunger slidably entering each of said die heads to have an upper end respectively in the path of said reciprocable head, said plunger having a lower face for driving said pin outwardly toward said die blocks; a body slidable in each die head carrying said pin therein, said body having a cam face; a cam face on each of said plungers; and resilient means normally maintaining each of said plungers in a predetermined initial position whereby abutment of said pin bodies thereagainst fix the positions of the outer ends of said pins in relation to said die blocks.

5. A double end rod heading device comprising a central fixed member; and under die block at each end of said member; an upper reciprocable member; a pair of upper die blocks carried by said reciprocable member to match respectively said under die blocks when lowered thereagainst; a die head mounted to reciprocate longitudinally toward and away from each of said under die blocks; means normally biasing each of said die heads to positions away from the under die blocks; a reciprocable head to which said reciprocable member is shiftably attached; resilient means between said reciprocable member and said reciprocable head; a cam face on each of said die heads; and cam followers carried by said reciprocable head to contact respectively said cam faces to drive said die heads against the outer ends of said upper and lower die blocks when closed upon travel of said reciprocable head theretoward; a pin longitudinally, slidably carried in each of said die heads axially aligned with the central axis through said lower and upper die blocks; and a plunger slidably entering each of said die heads to have an upper end respectively in the path of said reciprocable head, said plunger having a lower face for driving said pin outwardly toward said die blocks; a body slidable in each die head carrying said pin therein, said body having a cam face; a cam face on each of said plungers; and resilient means normally maintaining each of said plungers in a predetermined initial position whereby abutment of said pin bodies thereagainst fix the positions of the outer ends of said pins in relation to said die blocks; means on said central fixed member for receiving a blank rod thereon and limiting lateral travel of the rod in one direction; a slidable jaw movable toward said fixed member to grip said rod against the fixed member; means normally biasing the jaw to a position away from said fixed member; cam means for shifting the jaw toward the fixed member; and means carried by said reciprocable head to contact and operate said jaw cam means.

6. A double end rod heading device comprising a central fixed member; an under die block at each end of said member; an upper reciprocable member; a pair of upper die blocks carried by said reciprocable member to match respectively said under die blocks when lowered thereagainst; a die head mounted to reciprocate longitudinally toward and away from each of said under die blocks; means normally biasing each of said die heads to positions away from the under die blocks; a reciprocable head to which said reciprocable member is shiftably attached; resilient means between said reciprocable member and said reciprocable head; a cam face on each of said die heads; and cam followers carried by said reciprocable head to contact respectively said cam faces to drive said die heads against the outer ends of said upper and lower die blocks when closed upon travel of said reciprocable head theretoward; a pin longitudinally, slidably carried in each of said die heads axially aligned with the central axis through said lower and upper die blocks; and a plunger slidably entering each of said die heads to have an upper end respectively in the path of said reciprocable head, said plunger having a lower face for driving said pin outwardly toward said die blocks; a body slidable in each die head carrying said pin therein, said body having a cam face; a cam face on each of said plungers; and resilient means normally maintaining each of said plungers in a predetermined initial position whereby abutment of said pin bodies thereagainst fix the positions of the outer ends of said pins in relation to said die blocks; means on said central fixed member for receiving a blank rod thereon and limiting lateral travel of the rod in one direction; a slidable jaw movable toward said fixed member to grip said rod against the fixed member; means normally biasing the jaw to a position away from said fixed member; cam means for shifting the jaw toward the fixed member; and means carried by said reciprocable head to contact and operate said jaw cam means; resilient means yielding initially holding said jaw in said rod clamping position to permit longitudinal slippage of the rod for alignment by contact with both of said pin ends.

7. A double end rod heading device comprising a central fixed member; an under die block at each end of said member; an upper reciprocable member; a pair of upper die blocks carried by said reciprocable member to match respectively said under die blocks when lowered thereagainst; a die head mounted to reciprocate longitudinally toward and away from each of said under die blocks; means normally biasing each of said die heads to positions away from the under die blocks; a reciprocable head to which said reciprocable member is shiftably attached; resilient means between said reciprocable member and said reciprocable head; a cam face on each of said die heads; and cam followers carried by said reciprocable head to contact respectively said cam faces to drive said die heads against the outer ends of said upper and lower die blocks when closed upon travel of said reciprocable head theretoward; a pin longitudinally, slidably carried in each of said die heads axially aligned with the central axis through said lower and upper die blocks; and a plunger slidably entering each of said die heads to have an upper end respectively in the path of said reciprocable head, said plunger having a lower face for driving said pin outwardly toward said die blocks; a body slidable in each head carrying said pin therein, said body having a cam face; a cam face on each of said plungers; and resilient means normally maintaining each of said plungers in a predetermined initial position whereby abutment of said pin bodies thereagainst fix the positions of the outer ends of said pins in relation to said die blocks; means on said central fixed member for receiving a blank rod thereon and limiting lateral travel of the rod in one direction; a slidable jaw movable toward said fixed member to grip said rod against the fixed member; means normally biasing the jaw to a position away from said fixed member; cam means for shifting the jaw toward the fixed member; and means carried by said reciprocable head to contact and operate said jaw cam means; resilient means yielding initially holding said jaw in said rod clamping position to permit longitudinal slippage of the rod for alignment by contact with both of said pin ends; a pair of spaced apart hooks rockably carried to hang downwardly from said reciprocable member; said central fixed member having wells to receive said hooks forwardly of said rods; and means for biasing said hooks to swing rearwardly; a face on said jaw sloping upwardly and forwardly; said hooks having those lengths which will cause them to engage under a rod as said reciprocable member travels from said jaw and lift the rod to the top of said face and kick the rod rearwardly thereover.

8. A double end rod heading device comprising a central fixed member; an under die block at each end of said member; an upper reciprocable member; a pair of upper die blocks carried by said reciprocable member to match respectively said under die blocks when lowered thereagainst; a die head mounted to reciprocate longitudinally toward and away from each of said under die blocks; means normally biasing each of said die heads to positions away from the under die blocks; a reciprocable head to which said reciprocable member is shiftably attached; resilient means between said reciprocable member and said reciprocable head; a cam face on each of said die heads; and cam followers carried by said reciprocable head to contact respectively said cam faces to drive said die heads against the outer ends of said upper and lower die blocks when closed upon travel of said reciprocable head theretoward; a pin longitudinally, slidably carried in each of said die heads axially aligned with the central axis through said lower and upper die blocks; and a plunger slidably entering each of said die heads to have an upper end respectively in the path of said reciprocable head, said plunger having a lower face for driving said pin outwardly toward said die blocks; a body slidable in each die head carrying said pin therein, said body having a cam face; a cam face on each of said plungers; and resilient means normally maintaining each of said plungers in a predetermined initial position whereby abutment of said pin bodies thereagainst fix the positions of the outer ends of said pins in relation to said die blocks; each of said die heads having openings therein to telescope over the ends of said rod; and said pin ends terminating within said die head openings whereby said rod ends are formed in part in said die heads and in part in said die blocks.

9. Apparatus for simultaneously forming ends of a rod comprising reciprocable separable die parts receiving portions of said ends; die heads reciprocable longitudinally of the rod against said die parts and receiving portions of the rod ends therein; a drive pin in each of said die heads for forcing material of said ends into said die parts to shape them therein; and means initially setting said pins to abut and equalize said end portions at each said die part; and means yieldingly restraining the central portion of the rod against bending between said die parts and permitting initial longitudinal travel of the rod for said equalization; and a reciprocating head for sequential closing said die parts, shifting said die heads thereagainst, actuating said rod restraining means, and forcing said pins against said rod ends; and spring loaded hook means carried from said reciprocating head to engage said rod on its travel, opening said die parts and kicking the rod from said apparatus.

JOHN T. SHIELDS.

References Cited in the file of this patent

UNITED STATES PATENTS

| Number | Name | Date |
|---|---|---|
| 637,381 | Gifford | Nov. 21, 1899 |
| 1,352,911 | Paque | Sept. 14, 1920 |
| 1,894,526 | Wilcox | Jan. 17, 1933 |
| 2,174,970 | Cornell, Jr. | Oct. 3, 1939 |
| 2,278,643 | Braun | Apr. 7, 1942 |
| 2,382,339 | Skowron et al. | Aug. 14, 1945 |

FOREIGN PATENTS

| Number | Country | Date |
|---|---|---|
| 661,471 | Germany | June 18, 1938 |